United States Patent [19]

Hofstein

[11] 4,010,466
[45] Mar. 1, 1977

[54] METHOD AND SYSTEM OF ELECTRONIC IMAGE STORAGE AND DISPLAY

[75] Inventor: Steven R. Hofstein, North Brunswick, N.J.

[73] Assignee: Princeton Electronic Products, Inc., North Brunswick, N.J.

[22] Filed: Aug. 4, 1975

[21] Appl. No.: 601,615

[52] U.S. Cl. .................. 343/5 SC; 178/DIG. 18; 178/DIG. 24; 340/1 R; 340/3 R; 343/17

[51] Int. Cl.$^2$ .................. G01S 7/04; H04N 3/00

[58] Field of Search .......... 340/1 R, 3 R; 343/5 SC, 343/17; 178/DIG. 18, DIG. 24

[56] References Cited

UNITED STATES PATENTS

| | | | |
|---|---|---|---|
| 3,146,441 | 8/1964 | Miller | 343/5 SC |
| 3,392,385 | 7/1968 | Martin | 343/5 SC |
| 3,550,123 | 12/1970 | Brown et al. | 343/5 SC |
| 3,792,194 | 2/1974 | Wood et al. | 178/DIG. 24 |
| 3,830,971 | 8/1974 | Polder | 178/DIG. 24 |
| 3,864,660 | 2/1975 | Ranalli et al. | 340/1 R |
| 3,904,817 | 9/1975 | Hoffman et al. | 178/DIG. 24 |

Primary Examiner—Malcolm F. Hubler
Assistant Examiner—S. C. Buczinski
Attorney, Agent, or Firm—Samuelson & Jacob

[57] ABSTRACT

A method and system of electronic image storage and display wherein the display is viewed on a raster scan TV display and the incoming signal comprises a sequence of scan lines whose line rate is lower than that of the horizontal TV line rate within a field of the TV display and is an odd integer submultiple thereof. The incoming signal is stored in the memory of a scan converter and the stored image is scanned and displayed on a conventional television raster scan display.

The scan converter mode is alternated between read and write such that the writing is carried out during the time required to scan one horizontal TV line in the field and the reading is carried out during the time required to scan the next horizontal TV line in the field to thereby write and read on alternate horizontal lines of the same field.

To produce a spatially uniform raster, the horizontal TV lines of alternate TV fields are offset by one line from the horizontal TV lines of the preceding field.

120 Claims, 17 Drawing Figures

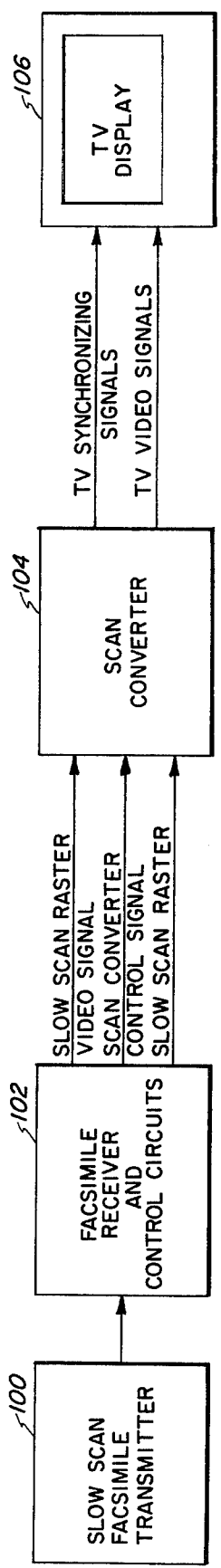
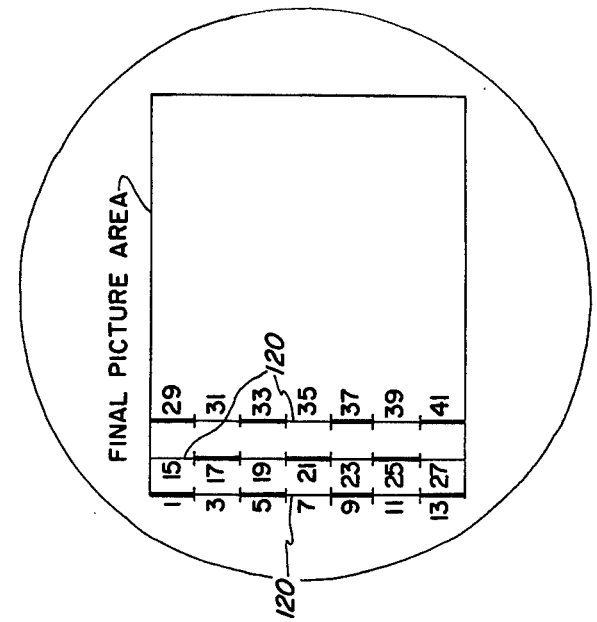
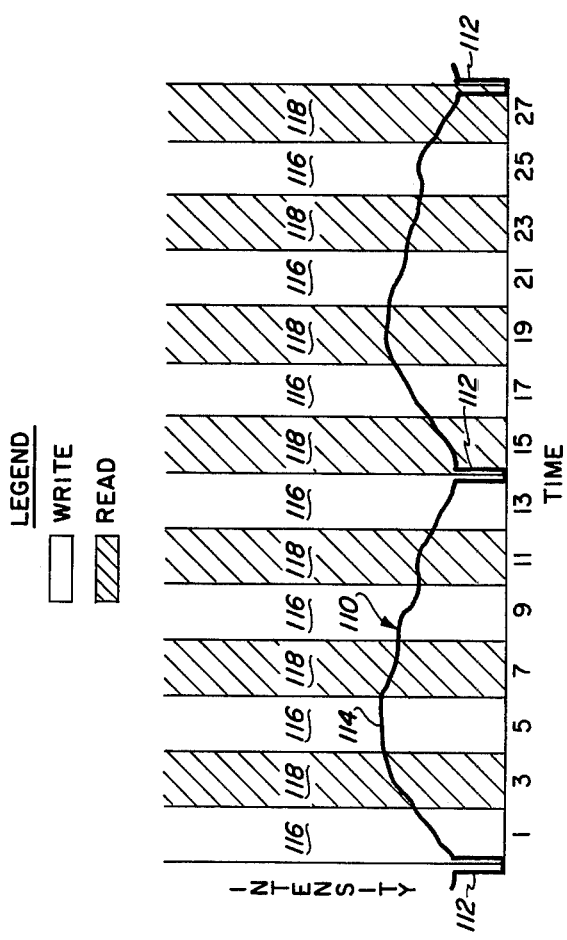
FIG. 1c
FIG. 6c
FIG. 5b

| $Q_1$ | $Q_2$ | $Q_3$ |
|---|---|---|
| VERTICAL DRIVE | SAME AS $Q_1$ | 0 |
| VERTICAL DRIVE | VERTICAL DRIVE OFFSET BY ONE HORIZONTAL LINE | + |

METHOD AND SYSTEM OF ELECTRONIC IMAGE STORAGE AND DISPLAY

The invention relates to a method and system of electronic image storage and display wherein the incoming signal comprises a sequence of scan lines whose line rate is lower than the horizontal TV line rate of the raster scan TV display. The incoming signal line rate is an odd number submultiple of the horizontal TV line rate.

Such systems are generally referred to as slow scan systems wherein the incoming signal line rate is lower than the horizontal TV line rate. For display at conventional TV display rates, it is necessary to store the incoming image for many frames of the reading scan time in order to obtain a complete visual image of the picture represented by the incoming signal. Examples of slow scan systems include, for example, telephone transmission facsimile, ultrasound medical scanners, sonar scanners and radar scanners. The last three of these systems include additional common characteristics, in that, an energy source generates a burst of short duration which is propagated through the medium and generates echoes which are to be examined or studied.

The burst of energy is reflected from various objects which are in its path and echoes are returned along the propagation path. The returned echoes are detected by suitable means and can then be converted to an electrical signal which can be used for display on a viewing screen. The intensity of the echo is proportional to the density and size of the reflecting object (reflectance of the object) and the time delay (elapsed time) between the initial transmitted pulse and the return echo is proportional to the distance between the source of the transmitted pulse and the reflecting object.

In radar systems, the emitted energy pulse is a short duration, electromagnetic or radio pulse. In sonar and ultrasound systems, the emitted energy pulse is a short duration acoustic or sound pulse. These pulses are often called "main bangs." In all these systems, a depicted source of the energy is synchronized with the actual position of the probe (antenna or sound transducer). In the case of radial scanned sonar and radar, the source is usually at the center of the display and the viewed sweep is synchronized with the sweep of the antenna or transducer. The returned echoes appear as intensified points along radial lines extending outwardly from the center. In ultrasound systems, however, the probe moves in space, e.g., along the contour of the human body and it may not be located at a fixed center. Nonetheless, it is necessary for the depicted energy source to be synchronized in position with the probe.

A major difficulty, which is encountered in obtaining a suitable display of the returned echo information in these systems, is encountered because the most commonly used displays are of the television raster type displays (rectangular). The information (returned echoes) appears initially as the intensification of a "spatial vector" which is rarely in synchronism with a raster scan type display. Consequently, special displays are used in direct viewing systems. In the case of radar, the display usually employs a cathode ray tube (CRT) in which the beam is swept from the center of the tube face to its periphery at some angle. The angle advances in synchronism with the rotation of the antenna and the center of the tube face corresponds to the location of the antenna. This is known as a radial or "rho-theta" display.

Since most radar scans and practically all sonar and ultrasound scans do not complete a full rotational cycle or a full image for a period varying from seconds to many minutes, some form of storage medium must be used in order to enable the viewer - operator to see a full, complete picture. Most commonly, the storage medium is a long persistence phosphor or a storage tye CRT.

An alternative to the use of special display configurations is to convert the scanned image for display on a conventional raster scan TV display. Such a system incorporates, as a fundamental element, a device known as a "scan converter." An essential component of a scan converter is a storage tube or some other electronic storage medium. In the storage tube types, the scan converter accepts the incoming information (in electronic form) and writes on the surface of the storage tube in a format which matches the beam direction or "vector" of the original electromagnetic or ultrasound energy beam. The returning echoes are written on the storage tube in their correct position and intensity corresponding to the position and reflectance of the original targets. Following the completion of the writing of the stored image, the storage tube beam then converts the stored information to a raster scan format in order to enable one to read the image out to an ordinary raster scan TV display.

A raster scan TV display is defined as a system which is scanned in the manner common to present American commercial and entertainment television standards. The display may use a cathode ray tube, gas discharge display or any other suitable mechanism on which the images may be observed visually. Throughout the specification, the discussion is directed toward the use of the present American TV standard of 525 horizontal lines per frame but the invention is not limited to that line rate. The teachings of the invention are completely consistent with other line rates such as 1029, 785, 625, etc., and other frame rates such as European frame rates of 25 frames per second.

If it is desired to view the "growth" or the generation of the image in "real time", it is usually convenient to use what is known as a "double-ended" storage tube. Such a tube consists of a single storage target with two electron guns (usually located on opposite sides of the target). In such a storage tube, one gun (the writing gun) writes the image on the target as the information is received from the ultrasound or other scanner. The other gun (reading gun) simultaneously reads the image stored on the target in raster scan format for presentation on a TV display.

The double-ended storage tubes have not been widely accepted in the commercial field for a number of reasons. The tubes are more expensive than single-ended tubes, are difficult to manufacture and the associated electronics are expensive, difficult to align and, to date, have not performed with a good efficiency to cost ratio. This relatively poor efficiency to cost ratio results, in part, from the complexity associated with the necessity of avoiding interference or crosstalk between the video signals of the writing and reading beams. In order to avoid this interference, it is necessary to utilize complex electronic circuitry which is quite difficult to maintain. As a consequence of these difficulties, the majority of scan converters use single-ended storage tubes. However, since a single gun is used for both writing and reading, it is not possible to write and read the stored image on the target simultaneously. Therefore, if an operator is to monitor the "growth" of an image as it is received, some "time-sharing" must be used to permit the electron beam to be used alternately for writing and reading the image. From here on, most of the discussion of the present invention will be directed toward its use in ultrasound type scanning systems while bearing in mind that the teaching of the invention may also be used for many radar or sonar type scaners as well as other slow scan systems such as slow raster scan facsimile systems.

A typical ultrasound scanner, which is used for medical diagnosis, generates a sound burst of very short duration. This sound burst is transmitted through the patient's body. Reflections of the sound pulse from the internal organs and other matter in the body are returned as sound echoes to the probe. The probe contains, as an essential element, an electroacoustic transducer which converts an electrical signal into the original sound burst and converts the returned sound echoes into electrical signals. The converted sound echoes are transmitted through processing circuits for the purpose of writing a visual image which depicts the condition in the interior of the body. Since the sound waves must penetrate through the body, be reflected and converted into electrical impulses in order to view the body interior and receive an echo from the point farthest from the probe, one must provide a reasonable time period for each ultrasound scan. A time period of as long as 500 microseconds is generally required.

The typcal electronic wave form which one views comprises a large spike which corresponds to the initiating pulse or main bang followed by signals of lesser intensity. The signals of lesser intensity are the echoes picked up by the ultrasound probe. Those furthest along the horizontal time axis are furthest from the ultrasound probe. One prior art technique utilizing a form of time sharing of the electron beam to permit the operator to view the image as it is being formed on the storage tube is described in U.S. Pat. No. 3,864,660 to Ralph Ranalli et al., issued Feb. 4, 1975. In this prior art system, every alternate ultrasound scan line is written and the target is read out to the TV display during the remaining intervals. Thus, in one time cycle, the ultrasound pulse is generated and the returning echoes are received and used to write the image on the storage tube. In the next time cycle, the storage tube reverts to a raster type format and reads out part of the image to the TV display. In one mode of such operation, the writing period is selected to be of 8 horizontal TV line time duration followed by a reading period of 7 horizontal TV line time duration. This yields a total write - read time cycle length of 15 horizontal TV line time duration. In a normal 525 line TV system, each horizontal line time duration is approximately 63.5 microseconds.

During odd fields, bands of reading information of 7 lines appear interspersed with blank bands of 8 lines. During even fields, the bands of reading information appear in the positions of the blank bands of the previous odd fields. Thus, the combination of one even and one odd field illuminates the full TV screen. HOwever, each reading band of 7 lines is occuring at a repetition rate equal to the "frame" rate, that is, once every two fields. This is a 30 hertz rate which produces a noticeable flicker. As a result, the viewer perceives an image of bands which flicker noticeably.

Accordingly, it is an important object of the invention to provide a method and system of electronic image storage and display of slow scan signals wherein there is little or no flicker percieved by one viewing the TV display.

It is a further object of the invention to provide such a method and system wherein the scan converter is provided with a single ended storage tube and alternating write - read operation is employed (time sharing of the electron beam).

It is yet another object of the invention to provide such a method and system wherein an odd number of horizontal TV lines appear during one slow scan line, as for example, between two adjacent ultrasound main bangs.

It is a still further object of the invention to provide such a method and system wherein there is writing and reading on an alternate horizontal TV line basis.

It is yet another object of the invention to provide such a method and system wherein an offset between alternate TV display fields is introduced to produce a spatially uniform raster.

These and other objects, advantages, features and uses will be apparent during the following description when taken together with the accompanying drawing.

Broadly, the invention provides a method and system of electronic image storage and display of slow scan incoming signals. A probe, such as an antenna for radar and an electroacoustic transducer assembly for sonar or medical ultrasound, transmits a signal into the medium under investigation. Radio or sound echoes, as the case may be, are reflected from areas in the medium which are denser than the ambient environment. These echoes are returned to the probe and are transformed into electrical signals which are suitably written on the target of a storage tube. These written signals are read out by a IV raster scan read signal so that the scene scanned by the probe can be viewed on a TV display.

In order to permit the operator to view the probed scene while the scene is still being scanned, it is necessary to use some type of time sharing of the electron gun of the storage tube. The operation of such a system requires that an odd number of horizontal TV lines appear during one slow scan line or, in other words, between two adjacent main band pulses. During alternate horizontal TV lines within the same field, the scan converter is switched between the writing mode and the reading mode. Because there are an odd number of horizontal TV lines between successive main bang pulses, the sum of two adjacent ultrasound scan line video signals produces a complete composite ultrasound wave form extending between the two ultrasound pulses. That is, those periods of the ultrasound video pulses which are deleted during the reading period during one ultrasound scan line are "filled in" by the immediately succeeding ultrasound scan line. Thus, a form of ultrasound or slow scan line segment interlace is obtained with a resultant improvement in the picture viewed on the TV display.

In the accompanying drawing, forming a part of this application, in which like numerals are employed to designate like parts throughout the same:

FIG. 1c is a view similar to that of FIG. 1 of a slow scan facsimile system for displaying the received facsimile image on a raster scan TV display;

FIG. 5b is a view similar to that of FIG. 5 of a slow scan facsimile system wherein there are seven horizontal TV lines between the facsimile synchronizing pulses;

FIG. 6c is a view similar to FIG. 6a showing three adjacent slow scan facsimile raster lines (spaced apart for clarity of illustration) as they are written on the storage surface to be displayed on the raster scan TV display;

Figure 1:
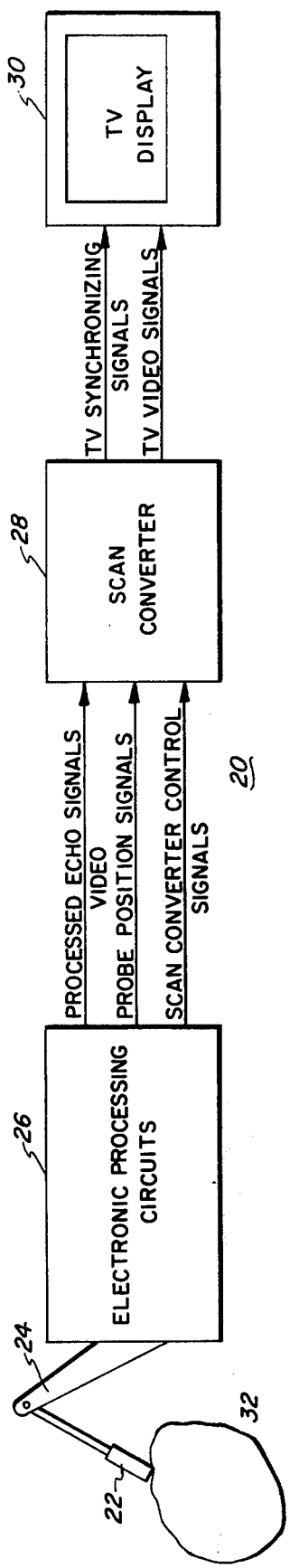
FIG. 1 is a block diagram of a system for displaying ultrasound images on a raster scan TV display.

In the drawing, wherein, for the purpose of illustration, there are shown preferred embodiments of the invention, the numeral 20 designates an ultrasound slow scan system generally. System 20 is seen to comprise (FIG. 1) an ultrasound probe transducer 22, a mechanical arm 24 on the end of which probe transducer 22 is mounted, elecronic processing circuits 26, a scan converter 28 and a TV display 30.

The probe 22 is placed in contact with an object to be scanned 32 and an acoustic ultrasound pulse is transmitted into the object, e.g., the human body. The acoustic pulse is derived from an ultrasonic generator which is a part of the electronic processing circuits 26 and the electrical pulse is converted into an acoustic pulse by the electroacoustic transducer in the probe 22. The transducer is preferably of the reversible type which converts electrical pulses into acoustic pulses and acoustic pulses into electrical pulses. Any suitable transducer for accomplishing the desired results may be used.

Suitable electrical circuits, which are not a part of this invention and whose details are not shown, produce a signal which locates the position of the probe on the target of the storage tube in the scan converter 28 and maintains this positional relationship as the probe is moved to various parts of the body by the operator.

As the acoustic pulse traverses the interior of the body 32, it encounters, in the case of the human body, the various organs and, perhaps, some undesired matter and/or growths. The organs and the undesired matter reflect the acoustic pulse which are received by the probe 22 in the form of returned echoes which are converted into electrical signals by the transducer in the probe 22. These electrical signals are converted into video signals by the return echo processing circuits which are a part of the electronic processing circuits 26. Together with the necessary scan converter control signals, as required, the video signals are transmitted to the scan converter 28 for writing the image on the storage tube of the scan converter 28. A typical single-ended electronic storage tube used in such scan converters has been described in my U.S. Pat. No. 3,631,294, issued Dec. 28, 1971. The image written on the storage tube is then raster scanned in the usual manner and is displayed on the TV display 30.

In order for these acoustic waves to penetrate through the human body, be reflected and returned to the probe, a time period of as long as 500 microseconds is necessary in order to ensure that information from the points furthest away from the probe are received.

Figure 1A:
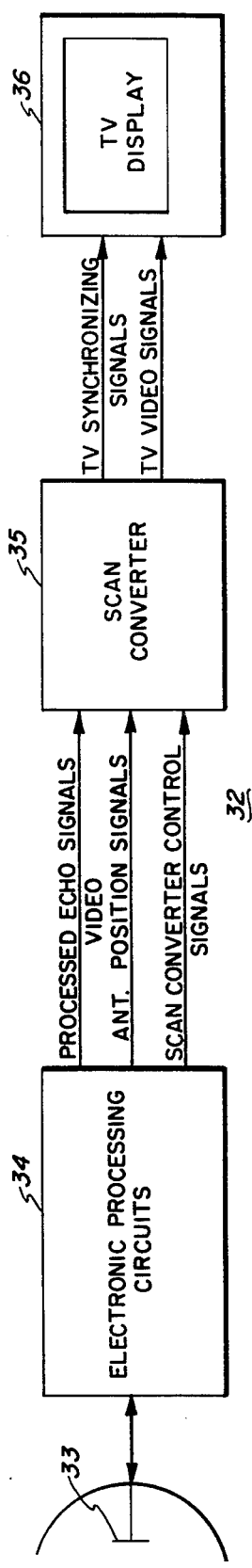
FIG. 1a is a view similar to that of FIG. 1 of a radial scan, slow scan radar system for displaying the radar echoes on a raster scan TV display.

In FIG. 1a, which is similar to FIG. 1, there is illustrated a slow scan radar system generally designated as 32. It comprises an antenna 33, processing circuits 34, a scan converter 35 and a TV display 36. The antenna scans the scans;the area under investigation and a series of radio pulse signals (main bangs) generated by the radar pulse generator, which is a part of the processing circuits 34, are transmitted from the antenna. The various objects, commonly referred to as targets, within the scanned area return echoes to the antenna 33. These returned echoes, which are radio signals, are processed and converted into video signals by the return echo processing circuits in the same manner as has been described in connection with the embodiment of FIG. 1. The video signals are fed to the scan converter 35 along with the TV synchronizing signals so that images of the proper intensity and position, commensurate with the reflectance and position of the targets, are written on the storage tube of the scan converter. The storage tube is then raster scanned in the usual manner and the image is displayed on the TV display 36.

Figure 1B:
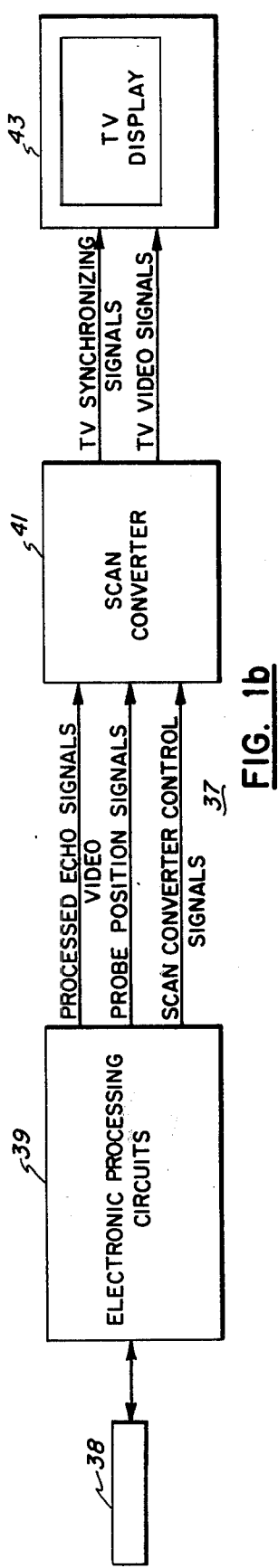
FIG. 1b is a view similar to that of FIG. 1 of a radial scan, slow scan sonar system for displaying the sonar echoes on a raster scan TV display.

In FIG. 1b, which is similar to FIG. 1, there is illustrated a slow scan sonar system designated generally as 37. The system is employed to obtain information regrding objects and events below the surface of water. A hydrophone 38, which is equipped with a reversible transducer which converts electrical pulses into acoustic pulses and converts acoustic pulses into electrical pulses, is suitably mounted so that the active (vibrating) face of the transducer is in contact with the water. A sound pulse geerator, which is a part of processing circuits 39, generates a series of electrical pulses which are applied to the transducer of hydrophone 38. The transducer converts the electrical signals into acoustic signals which are propagated into the water. When the acoustic signals encounter an object, the acoustic signals are reflected back to the transducer where the returned echoes are converted into electrical signals.

The electrical signals are converted into video signals by the return echo processing circuits, which are a part of the signal processing circuits 39, and suitable echo video signals are fed to the scan converter 41 to be stored on the memory. The timing for writing and reading on the storage medium (memory) of the scan converter is determined in the manner which will be described later. The storage tube in the scan converter is raster scanned and the image is displayed on the TV display 43.

Figure 2:
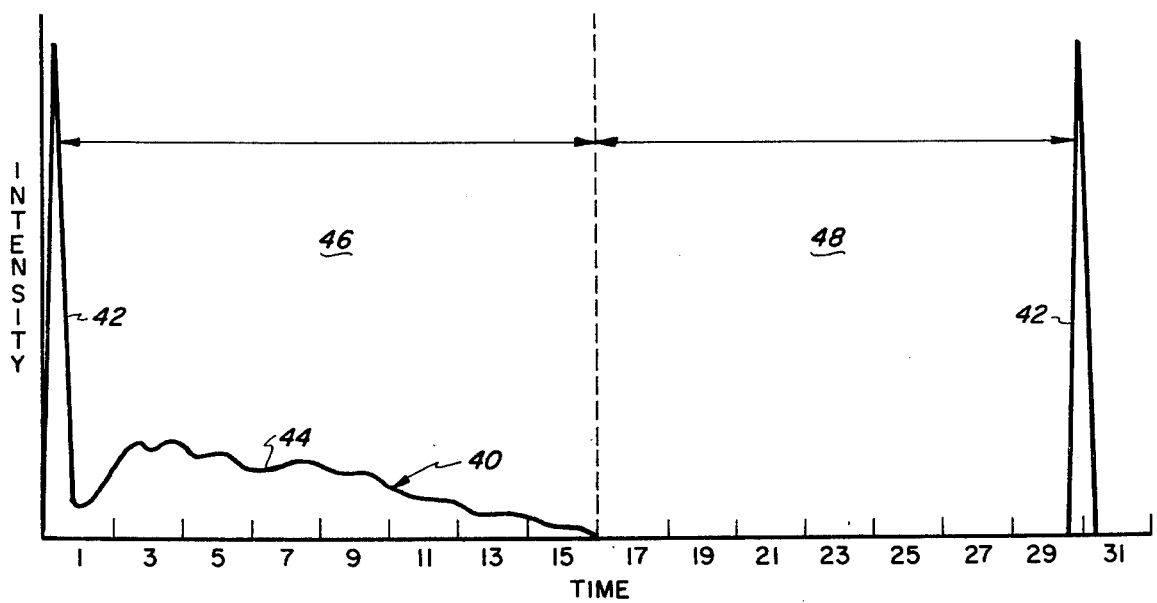
FIG. 2 is a plot of a typical electronic wave form illustrating a prior art spacing of eight write plus seven read horizontal TV lines between successive ultrasound scans.

In FIG. 2 there is illustrated a typical electronic wave form 40 showing the initiating pulse or main bang 42 and the returned echoes 44. This plot is in intensity versus time and shows the electrical signals as they are received by the probe's transducer. The greater the intensity of the signal, the denser is the object in the body corresponding to that signal. The numbers along the time axis represent the horizontal TV lines and the space occupied by each line on the axis represents the time needed to scan the line. One of the prior art methods for obtaining time sharing of the electron gun to permit the operator to view the image on the TV display as it is written on the storage tube is described in U.S. Pat. No. 3,864,660, issued Feb. 4, 1975.

That patent describes a technique in which every alternate ultrasound scan line is written and during the remaining intervals the storage tube target is read out to the TV display. A time diagram consistent with this technique is illustrated in FIG. 2. There the write period is seen to utilize the time of eight horizontal TV lines and the read period utilizes the time of seven horizontal TV lines. In the first time cycle 46, the ultrasound pulse 42 is generated and the returned echoes 44 are received and used to write an image on the storage tube. In the next time cycle 48, the storage tube reverts to a raster scan format and reads out the image on the storage tube to the TV display. One of the modes of such operation is illustrated in FIG. 2 in which the writing mode period is selected to have the duration of eight horizontal TV lines and the following reading mode period has the duration of seven horizontal TV lines. Thus, one obtains a total write - read time cycle time length of 15 horizontal TV lines.

Figure 3:
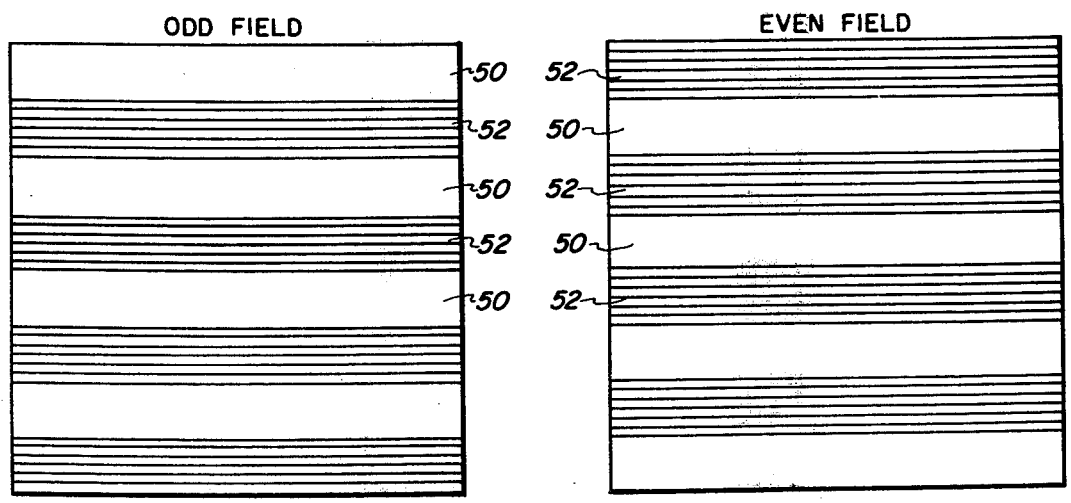
FIG. 3 is a view of a TV screen during an odd and an even field showing the blank portions which occur when using one of the prior art scanning methods and systems.
Figure 4:
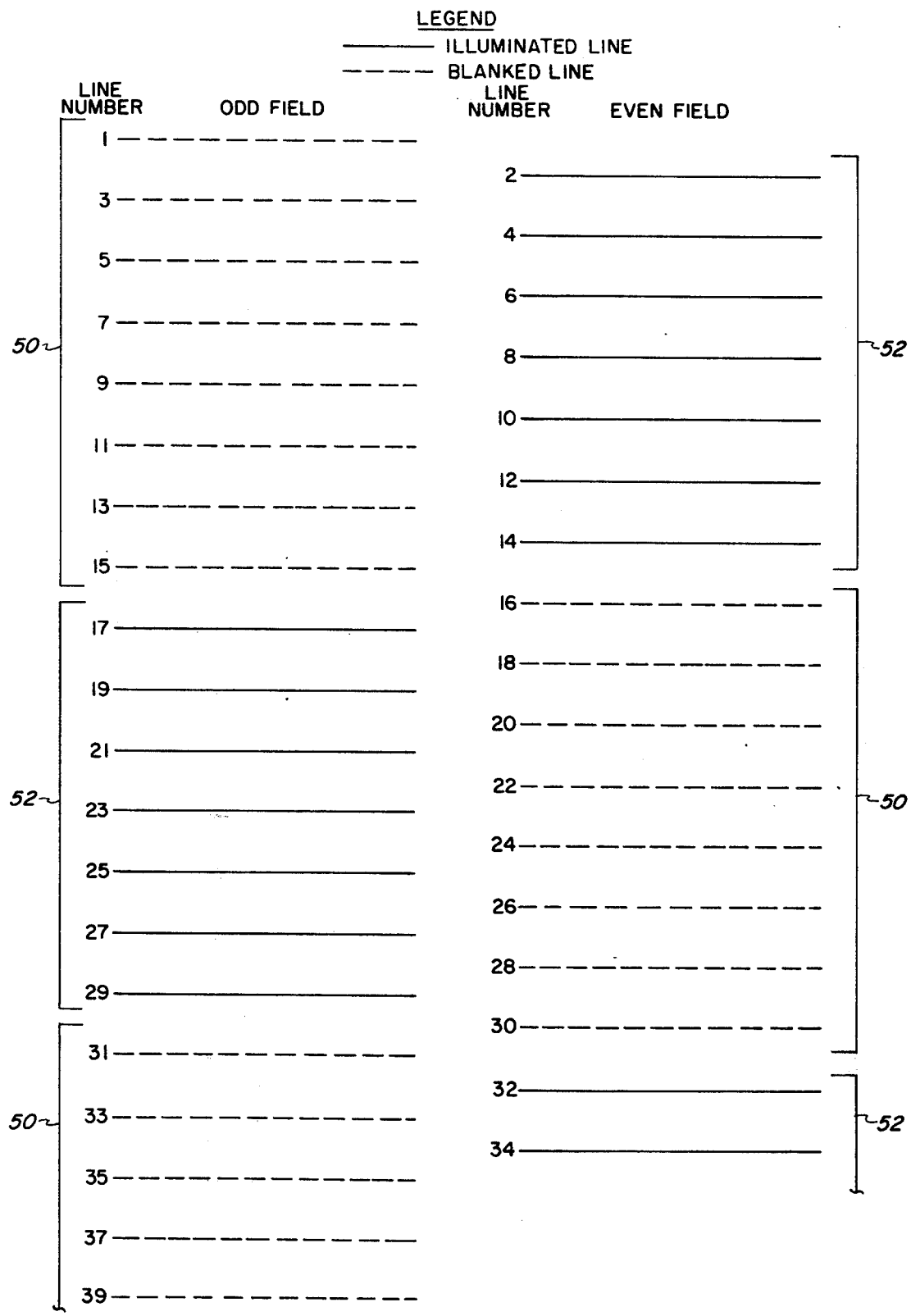
FIG. 4 is a view showing a portion of the screen of FIG. 3 expanded in the vertical direction.

In a 60 hertz field rate 2:1 interlace, 525 line TV system the time required for each horizontal line is approximately 63.5 microseconds. FIGS. 3 and 4 illustrate the appearance on such a TV screen of the format of FIG. 2. In both the odd and even fields, FIG. 3 shows blank bands 50 of eight lines (ultrasound write mode) interspersed with image bands 52 of seven lines (read mode). Thus, the combination of one even and one odd field illuminates the full screen. However, the blank bands (ultrasound write mode) occur at a repetition rate equal to the frame rate, i.e. once every two fields. This is a 30 hertz rate which results in noticeable flicker and the viewer perceives this flickering image of bands. FIG. 4, which is an expansion of FIG. 3 vertically, illustrates the relative positions of the image or illuminated (read) lines and the blanked (write) lines for successive fields.

The present invention overcomes this inherent disadvantage of the prior art system described above by writing and reading on a time cycle basis of every other horizontal TV line rather than by assigning a writing time to one complete ultrasound line. It should be borne in mind during this discussion that the ultrasound line rate is lower than the horizontal TV line rate.

Figure 5:
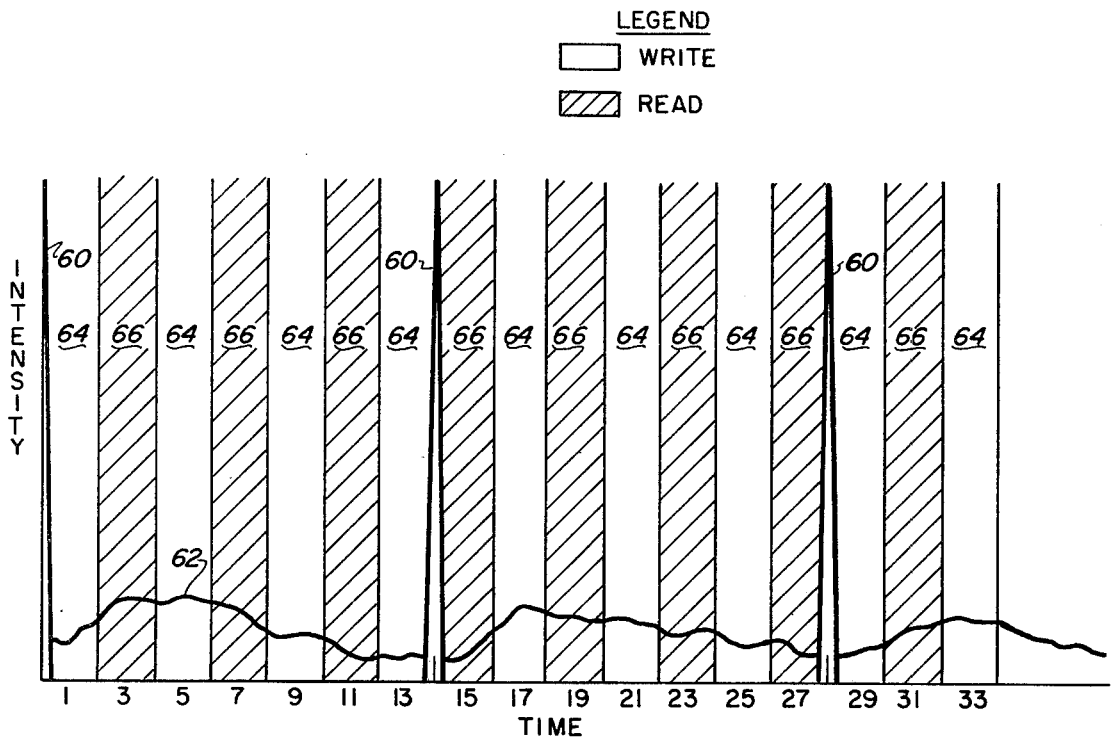
FIG. 5 is a plot of the electronic wave form of intensity against time expressed in horizontal Tv line numbers during an odd field showing the alternate horizontal TV line write - read configuration used in the instant invention, there being, in this example, seven horizontal TV lines between successive main bangs.

In FIG. 5, the time duration of each ultrasound line (time between transmitted pulses) is represented in terms of horizontal TV lines within the same field. FIG. 5 is a plot for a portion of an odd field of intensity against time of the signal at the probe. In the figure, we see the main bangs 60, the returned echoes 62 and the representation of the writing and reading on alternate horizontal TV line as controlled by the scan converter. The write line times are designated as 64 and the read line times as 66.

The basic technique of the invention requires that an odd number of horizontal TV lines appear between two adjacent main bang pulses. This is controlled by proper selection of the repetition rate of the ultrasound generator which initiates the pulses. In FIG. 5 the number of lines is shown as seven and in FIG. 5a as nine. These two modes are preferred but any odd number may be used.

Since the line rate of the incoming signal fed from the probe to the scan converter is lower than the horizontal TV line rate, the line rate of the incoming signal is defined as being an odd integer submultiple of the horizontal TV line rate. During alternate horizontal TV lines within the same field, the scan of the storage tube is switched between writing and reading. Because of the selection of an odd number of horizontal TV lines between successive main bangs, it is found that, when two adjacent ultrasound scan line video signals are examined, the sum of these two adjacent signals is a complete video waveform extending between the two ultrasound main bangs. That is, those periods of the ultrasound video which are deleted during the reading periods of one ultrasound scan line are filled in by the immediately following ultrasound scan line. Thus, we have obtained a form of slow scan line segment interlace.

Figure 5A:
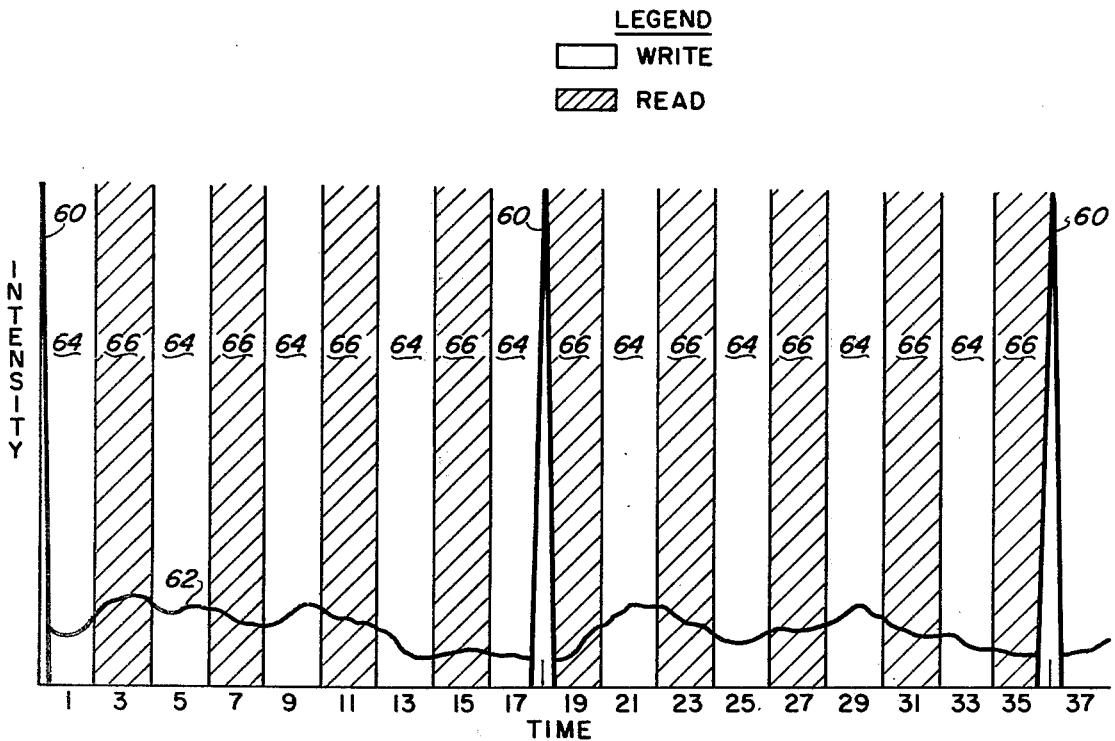
FIG. 5a is a view similar to that of FIG. 5 wherein there are nine horizontal TV lines between main bangs.
Figure 6A:
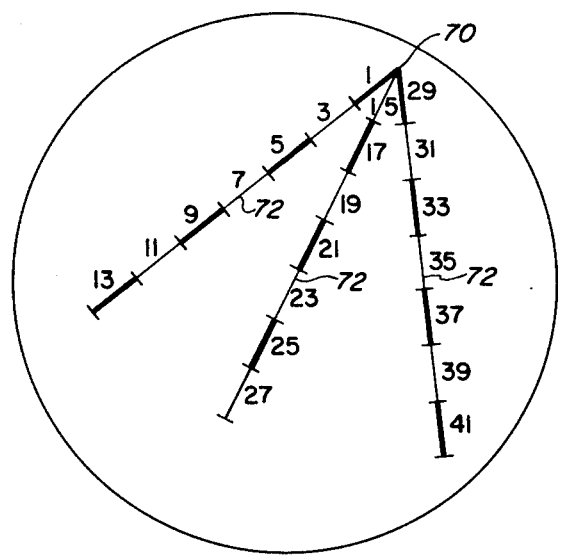
FIG. 6a shows a greatly expanded representation of successive ultrasound scan lines of an odd field used in carrying out the teachings of this invention.

In the conventional system illustrated in FIG. 2, one single ultrasound scan line is written completely and the next ultrasound scan line is ignored by the scan converter while the stored image is read. In the system of the invention, as illustrated in FIGS. 5, 5a and 6a, each ultrasound scan line is broken into segments and the segments of two adjacent ultrasound scan lines interlace where, since the probe usually moves only slightly between two ultrasound scan lines, the resultant composite line appears to the viewer to form a single continuous line. This results from the fact that, in the usual cases, the probe moves sufficiently slowly so that adjacent ultrasound scan lines are very close together and the image created appears continuous without any loss of information.

The major advantage of the invention resides in the fact that the image viewed on the TV screen is free of flicker for all practical purposes. In a conventional TV display, each TV frame consists of an odd field and an even field. In the odd field, all odd numbered horizontal TV lines are scanned sequentially. In the following even field, all even numbered horizontal TV lines are scanned sequentially. This is known as 2:1 interlace. Although any one line is scanned at a 30 hertz rate, the close proximity of the adjacent odd and even lines gives the illusion of a 60 hertz rate and hence appears to be flicker free at normal viewing distances.

FIG. 6a is a plot showing spatial representations of the ultrasound scan lines wherein time is measured along the scan line and the origin, which corresponds to the probe position, is designated as 70. The scan lines are designated as 72 and the odd numbers along the scan lines correspond to the line numbers of an odd TV field. In FIG. 6a, the adjacent lines are shown far apart but in actuality they are quite close together so that the displayed line appears as a nearly full line. The heavy portions of the scan lines indicate the written portions and the lighter portions indicate the unwritten portions while the electron beam has switched to the raster scan read mode.

Figure 6B:
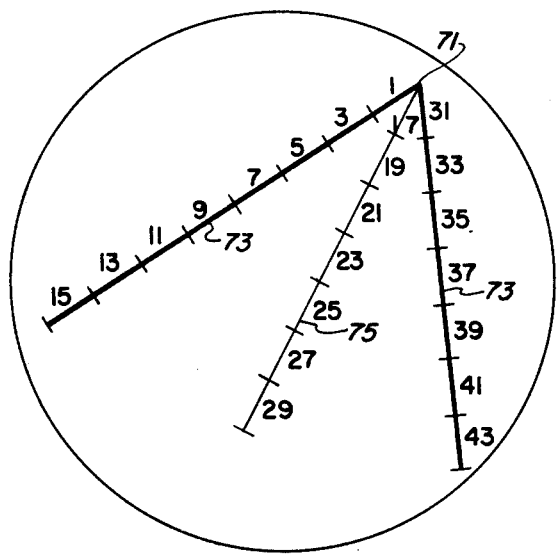
FIG. 6b is a view similar to FIG. 6a showing the adjacent ultrasound scan lines as written in the eight - seven system of FIG. 2.

FIG. 6b illustrates the prior art representation of the ultrasound scan of FIGS. 3 and 4. The origin corresponding to the probe position is designated as 71. The write lines of the ultrasound scan are shown in heavy lines and are designated 73. The line which is shown in a lighter line is the unwritten ultrasound scan line which occurs while the storage tube beam is in the raster scan read mode and is designated as 75. The odd numbers along the lines correspond to the line numbers of an odd TV field.

Figure 7:
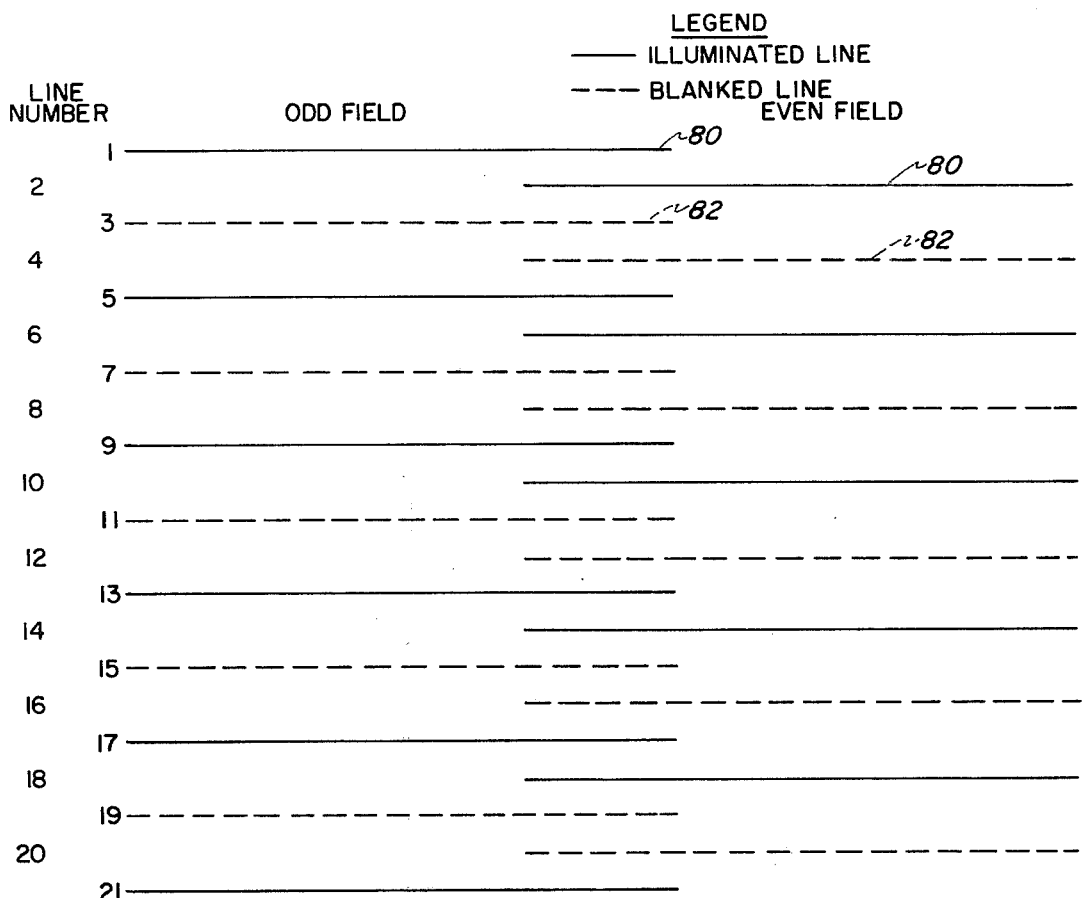
FIG. 7 is an expanded depiction of a TV display showing the write - read program of the odd and even fields which produces pairs of TV raster lines which are "paired" or, that are unequally spaced from each other.

FIG. 7 illustrates a view of a portion of the TV display of FIG. 6a greatly expanded in the vertical direction. It is seen that the displayed or illuminated lines 80 which are shown in full lines and the blanked lines 82 are shown in dash lines. The numbers associated with the lines 80 and 82 designate the horizontal TV lines of both the odd and even fields. As has been discussed above, a conventional TV display consists of one frame which consists of two alternating fields, designated as odd and even. The odd field is that in which the odd numbered horizontal TV lines are illuminated and they are designated 1, 3, 5, 7, etc. In the even field, the even horizontal TV lines, which are designated 2, 4, 6, 8, etc., are illuminated. The odd and even fields recur at a rate of 30 hertz. However, the total field rate is 60 hertz.

Due to the close proximity of the adjacent even and odd lines, the combination of the two adjacent lines appears to be flicker free at 60 hertz even though a single line alone would appear to flicker at 30 hertz. This is the conventional 2:1 TV interlace which is used to eliminate flicker.

Considering FIG. 7, it is seen that, e.g. line 1 is displayed and line 3 is blanked and similarly, line 2 is displayed and line 4 is blanked, etc. These displayed lines are designated as 80. The paired lines 1 and 2 and 5 and 6, etc. appear as relatively flicker free lines. However, the large gap left by the blanked or missing lines 3 and 4 and 7 and 8, etc. is in itself objectionable. These blanked lines are designated as 82.

Figure 8:
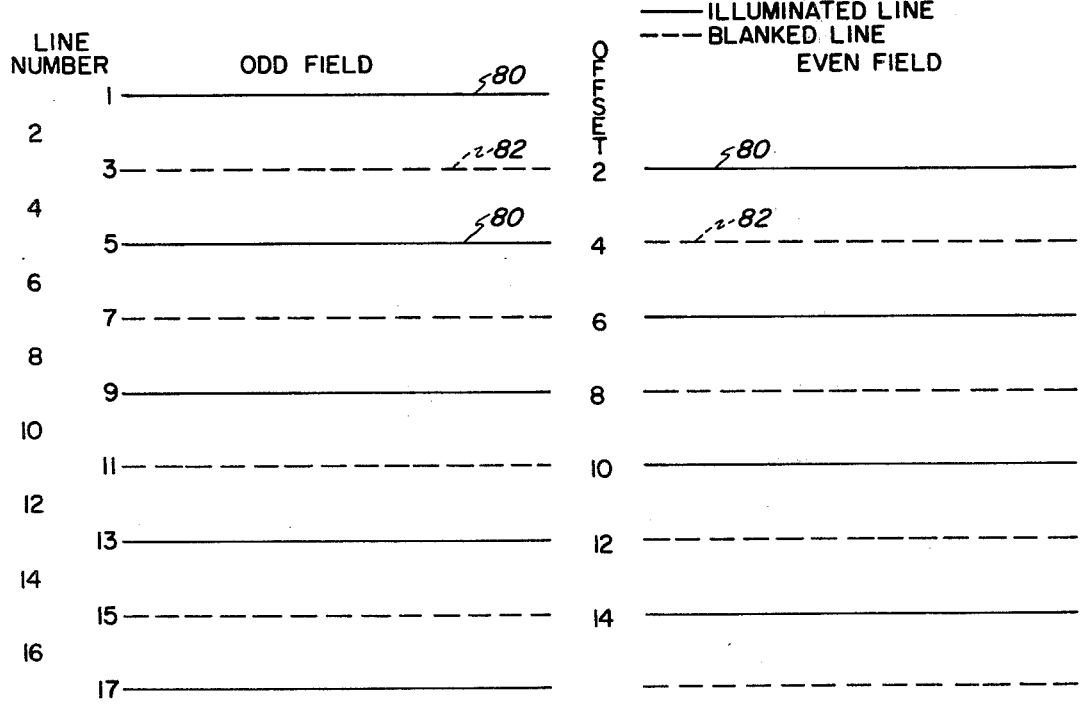
FIG. 8 is a view similar to that of FIG. 7 wherein the TV raster lines are equally spaced by offsetting the even fields from the odd fields by one horizontal line.

To overcome this objectionable feature, it is desirable to insert a vertical position offset between even and odd successive fields which makes the displayed lines equidistant while still maintaining a flicker free display. The result of this shift is shown in FIG. 8. The numbers at the left of the figure designate the odd and even lines before offset. The even numbers close to the even field lines show the position of the even horizontal TV lines after the even field has been offset.

The displayed lines are now equally spaced and are still close enough to maintain a flicker free display. The even field may be offset by any of a number of means. One method of obtaining such an offset is to modify the basic synchronizing signal being fed to the TV display such that the ordinary TV interlace is eliminated and then illuminate or read the appropriate lines. For example, instead of using a 525 line 2:1 interlace synchronization, a 524 line noninterlace signal is generated. Then, the so-called odd and even fields will, in fact, overlap. An examination of FIG. 8 shows that the effect of offsetting the even field by one horizontal line is to cause the offset even lines to occupy the positions of blanked out lines of the odd field. Thus, if a noninterlace TV signal is used, the even lines occupy the space of the odd lines to begin with. Then by blanking out the correct even line signals, the display of FIG. 8 will be obtained. For example, in FIG. 8, the odd field lines 1, 5, 9, 13, etc. are illuminated. With a noninterlaced synchronizing signal, the corresponding even field lines 2, 6, 10, 14, etc. occupy the same spaces as odd field lines 1, 5, 9, 13, etc. and are blanked while lines 4, 8, 12, 16, etc. are illuminated. Thus, the display of FIG. 8 is obtained.

Figures 9, 10:
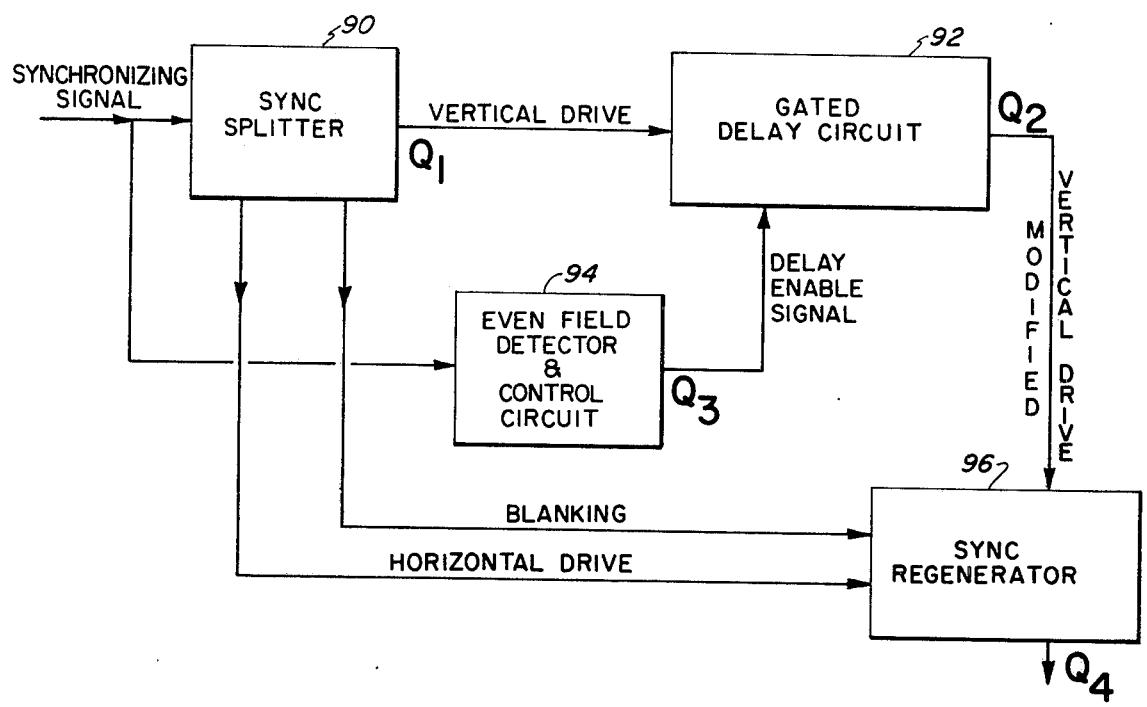
FIG. 9 is a block schematic diagram of a circuit for offsetting the vertical drive pulse in order to obtain a one line offset between the odd and even fields.
FIG. 10 is a table showing the relationships among the elements of the circuit of FIG. 9.

FIG. 9 is a block schematic diagram of a circuit which may be used for a second manner of achieving the offset required to obtain the uniformly spaced raster of FIG. 8. The 525 line 2:1 interlace synchronizing signal is passed through a sync splitter 90. Sync splitter 90 breaks the synchronizing signal into its components, namely, vertical drive, horizontal drive and blanking signals. The vertical drive signal is designated as $Q_1$ and is applied to a gated delay circuit 92 whose output is a modified vertical drive signal $Q_2$. Signal $Q_2$ is delayed in the presence of a positive control signal which is fed to gated delay circuit 92 from an even field detector 94. Even field detector 94 generates a delay-enable (positive control) signal $Q_3$. When the signal $q_3$ is a 0 then signal $Q_1$ is passed through circuit 92 undelayed and signal $Q_2$ is the same as signal $Q_1$. The positive control delay-enable signal $Q_3$ is derived from circuit 94 which detects the presence of an even field directly from the synchronizing signal and $Q_3$ is positive in the presence of an even field.

When signal $Q_3$ is positive, signal $Q_2$ is modified to offset the field on the raster by one horizontal line. Signal $Q_2$ and the suitable blanking and horizontal drive signals are fed to a sync regenerator 96 whose output $Q_4$ is the suitably modified regenerated synchronizing signal to be used in producing the display of FIG. 8 on a conventional TV monitor.

FIG. 10 illustrates the truth table showing the relationships among signals $Q_1$, $Q_2$ and $Q_3$. When $Q_3$ is zero, $Q_1$ and $Q_2$ are the same and when $Q_3$ is positive, $Q_2$ is such that the vertical drive is delayed by one line.

FIGS. 1c, 5b and 6c are used to illustrate the application of the teachings of the invention to a slow scan facsimile system. The said system is seen to comprise (FIG. 1c) a slow scan facsimile transmitter 100, a facsimile receiver and control circuits 102, a scan converter 104 and a TV display 106. The transmitter 100 transmits a slow scan composite video signal to receiver 102 either by wire or by radio. The composite video signal contains both the video and the slow scan synchronization signals. The composite video signal is separated into these components by the circuits in facsimile receiver and control circuits 102. The slow scan synchronization signals are used to generate the slow scan raster.

The separate signals, namely, slow scan raster video signal, scan converter control signal and the slow scan raster are fed to scan converter 104 which in turn feeds the appropriate video and TV synchronization signals to TV display 106.

In FIG. 5b, the composite TV signal is designated generally as 110. The vertical axis designates signal intensity and the horizontal axis designates time in terms of horizontal TV lines of an odd field. In this figure, there are seven horizontal TV lines between successive facsimile synchronizing pulses 112 and the video signal 114 is written during alternate horizontal TV lines 116 and the image on the storage tube is read during the other horizontal TV lines 118. While FIG. 5b illustrates the slow scan line time to be seven horizontal TV lines in duration, other odd integer submultiples of the horizontal TV line rate may be used and in particular, the slow scan line time having a duration of nine horizontal TV lines, such as is illustrated in FIG. 5a, may be used for such a slow scan facsimile system.

FIG. 6c similar to FIG. 6a and illustrates, in an analogous form thereto, adjacent slow scan raster lines 120 having heavy portions to indicate the written portions and lighter portions to indicate the unwritten portions while the electron beam has switched to the raster scan read mode.

It is evident to one skilled in the art that the observed result on the TV display 106 will be similar to that previously described and that the use of the modified vertical drive technique illustrated in FIGS. 8, 9 and 10 and described above may be used with the facsimile system of FIG. 1c. Moreover, the 524 line noninterlace signal may also be used, if desired.

While preferred embodiments of the invention have been shown and described, it is apparent to those skilled in the art that modifications and changes may be made without departing from the spirit of the invention and the scope of the subjoined claims.

The embodiments of the invention in which an exclusive property or privilege is claimed are defined as follows:

1. A method of operating a system to display an image on a raster scan TV display wherein an incoming signal comprises a sequence of scan lines whose line rate is lower than the horizontal TV line rate within a field of the TV display, the method comprising:
    selecting an incoming signal line rate to be an odd integer submultiple of the horizontal TV line rate;
    applying the incoming signal to a scan converter having a memory therein and storing the incoming signal in segments in the memory by writing each segment into the memory during the time required to scan one horizontal TV line of the field; and
    scanning the memory and displaying the signal stored therein on the TV display by reading from the memory during the time required to scan the next horizontal TV line in the field to thereby write and read during alternate horizontal TV lines of the same field.
2. The invention of claim 1 wherein:
    the line rate of the incoming signal is equal to one seventh the rate of scanning of the horizontal TV lines of the raster scan TV display.
3. The invention of claim 1 wherein:
    the line rate of the incoming signal is equal to one ninth the rate of scanning of the horizontal TV lines of the raster scan TV display.
4. The invention of claim 3 wherein:
    the horizontal TV lines of one field which are illuminated during reading are offset vertically from the horizontal TV lines of the preceding field which are illuminated during reading to thereby produce a spatially uniform read raster.
5. The invention of claim 2 wherein:
    the horizontal TV lines of one field which are illuminated during reading are offset vertically from the horizontal TV lines of the preceding field which are illuminated during reading to thereby produce a spatially uniform raster.
6. The invention of claim 1 wherein:
    the horizontal TV lines of one field which are illuminated during reading are offset vertically from the horizontal TV lines of the preceding field which are illuminated during reading to thereby produce a spatially uniform raster.
7. The invention of claim 6 wherein:
    the incoming signal is generated from an ultrasound signal.
8. The invention of claim 6 wherein:
    the incoming signal is generated from a sonar signal.
9. The invention of claim 6 wherein:
    the incoming signal is generated from a radar signal.
10. The invention of claim 6 wherein:
    the incoming signal is generated from a facsimile signal.
11. The invention of claim 5 wherein:
    the incoming signal is generated from an ultrasound signal.
12. The invention of claim 5 wherein:
    the incoming signal is generated from a sonar signal.
13. The invention of claim 5 wherein:
    the incoming signal is generated from a radar signal.
14. The invention of claim 5 wherein:
    the incoming signal is generated from a facsimile signal.
15. The invention of claim 4 wherein:
    the incoming signal is generated from an ultrasound signal.
16. The invention of claim 4 wherein:
    the incoming signal is generated from a sonar signal.
17. The invention of claim 4 wherein:
    the incoming signal is generated from a radar signal.
18. The invention of claim 4 wherein:
    the incoming signal is generated from a facsimile signal.
19. The invention of claim 3 wherein:
    the incoming signal is generated from an ultrasound signal.
20. The invention of claim 3 wherein:
    the incoming signal is generated from a sonar signal.
21. The invention of claim 3 wherein:
    the incoming signal is generated from a radar signal.
22. The invention of claim 3 wherein:
    the incoming signal is generated from a facsimile signal.
23. The invention of claim 2 wherein:
    the incoming signal is generated from an ultrasound signal.
24. The invention of claim 2 wherein:
    the incoming signal is generated from a sonar signal.
25. The invention of claim 2 wherein:
    the incoming signal is generated from a radar signal.
26. The invention of claim 2 wherein:
    the incoming signal is generated from a facsimile signal.
27. The invention of claim 1 wherein:
    the incoming signal is generated from an ultrasound signal.
28. The invention of claim 1 wherein:
    the incoming signal is generated from a sonar signal.
29. The invention of claim 1 wherein:
    the incoming signal is generated from a radar signal.

30. The invention of claim 1 wherein:
the incoming signal is generated from a facsimile signal.

31. A method of operating a system to display an image on a raster scan TV display wherein an incoming signal comprises a sequence of scan lines whose line rate is lower than the horizontal TV line rate within a field of the TV display, the method comprising:
selecting an incoming signal line rate to be an odd integer submultiple of the horizontal TV line rate;
applying the incoming signal to a scan converter having an electronic storage tube therein and storing the incoming signal in segments in the electronic storage tube by writing each segment into the electronic storage tube during the time required to scan one horizontal TV line of the field; and
scanning the electronic storage tube and displaying the signal stored therein on the TV display by reading from the electronic storage tube during the time required to scan the next horizontal TV line in the field to thereby write and read during alternate horizontal TV lines of the same field.

32. The invention of claim 31 wherein:
the line rate of the incoming signal is equal to one seventh the rate of scanning of the horizontal TV lines of the raster scan TV display.

33. The invention of claim 31 wherein:
the line rate of the incoming signal is equal to one ninth the rate of scanning of the horizontal TV lines of the raster scan TV display.

34. The invention of claim 33 wherein:
the horizontal TV lines of one field which are illuminated during reading are offset vertically from the horizontal TV lines of the preceding field which are illuminated during reading to thereby produce a spatially uniform read raster.

35. The invention of claim 32 wherein:
the horizontal TV lines of one field which are illuminated during reading are offset vertically from the horizontal TV lines of the preceding field which are illuminated during reading to thereby produce a spatially uniform read raster.

36. The invention of claim 31 wherein:
the horizontal TV lines of one field which are illuminated during reading are offset vertically from the horizontal TV lines of the preceding field which are illuminated during reading to thereby produce a spatially uniform read raster.

37. The invention of claim 36 wherein:
the incoming signal is generated from an ultrasound signal.

38. The invention of claim 36 wherein:
the incoming signal is generated from a sonar signal.

39. The invention of claim 36 wherein:
the incoming signal is generated from a radar signal.

40. The invention of claim 36 wherein:
the incoming signal is generated from a facsimile signal.

41. The invention of claim 35 wherein:
the incoming signal is generated from an ultrasound signal.

42. The invention of claim 35 wherein:
the incoming signal is generated from a sonar signal.

43. The invention of claim 35 wherein:
the incoming signal is generated from a radar signal.

44. The invention of claim 35 wherein:
the incoming signal is generated from a facsimile signal.

45. The invention of claim 34 wherein:
the incoming signal is generated from an ultrasound signal.

46. The invention of claim 34 wherein:
the incoming signal is generated from a sonar signal.

47. The invention of claim 34 wherein:
the incoming signal is generated from a radar signal.

48. The invention of claim 34 wherein:
the incoming signal is generated from a facsimile signal.

49. The invention of claim 33 wherein:
the incoming signal is generated from an ultrasound signal.

50. The invention of claim 33 wherein:
the incoming signal is generated from a sonar signal.

51. The invention of claim 33 wherein:
the incoming signal is generated from a radar signal.

52. The invention of claim 33 wherein:
the incoming signal is generated from a facsimile signal.

53. The invention of claim 32 wherein:
the incoming signal is generated from an ultrasound signal.

54. The invention of claim 32 wherein:
the incoming signal is generated from a sonar signal.

55. The invention of claim 32 wherein:
the incoming signal is generated from a radar signal.

56. The invention of claim 32 wherein:
the incoming signal is generated from a facsimile signal.

57. The invention of claim 31 wherein:
the incoming signal is generated from an ultrasound signal.

58. The invention of claim 31 wherein:
the incoming signal is generated from a sonar signal.

59. The invention of claim 31 wherein:
the incoming signal is generated from a radar signal.

60. The invention of claim 31 wherein:
the incoming signal is generated from a facsimile signal.

61. In a system of electronic image storage and display having a scan converter with a memory therein and a raster scan TV display wherein an incoming comprises a sequence of scan lines whose line rate is lower than the horizontal TV line rate within a field of the TV display, the improvement comprising:
means for selecting an incoming signal line rate to be an odd integer submultiple of the horizontal TV line rate;
means for applying the incoming signal to the scan converter and storing the incoming signal in segments in the memory by writing each segment into the memory during the time required to scan one horizontal TV line of the field; and
means for scanning the memory and displaying the signal stored therein on the TV display by reading from the memory during the time required to scan the next horizontal TV line in the field to thereby write and read during alternate horizontal TV lines of the same field.

62. The invention of claim 61 wherein:
the incoming signal line rate is equal to one seventh the rate of scanning of the horizontal TV lines.

63. The invention of claim 61 wherein:
the incoming signal line rate is equal to one ninth the rate of scanning of the horizontal TV lines.

64. The invention of claim 63 including:
means for offsetting vertically the horizontal TV lines of one field which are illuminated during reading from the horizontal TV lines of the preceding field which are illuminated during reading to thereby produce a spatially uniform read raster.

65. The invention of claim 62 including:
means for offsetting vertically the horizontal TV lines of one field which are illuminated during reading from the horizontal TV lines of the preceding field which are illuminated during reading to thereby produce a spatially uniform read raster.

66. The invention of claim 61 including:
means for offsetting vertically the horizontal TV lines of one field which are illuminated during reading from the horizontal TV lines of the preceding field which are illuminated during reading to thereby produce a spatially uniform read raster.

67. The invention of claim 66 wherein:
the memory is a single-ended electronic storage tube.

68. The invention of claim 65 wherein:
the memory is a single-ended electronic storage tube.

69. The invention of claim 64 wherein:
the memory is a single-ended electronic storage tube.

70. The invention of claim 63 wherein:
the memory is a single-ended electronic storage tube.

71. The invention of claim 62 wherein:
the memory is a single-ended electronic storage tube.

72. The invention of claim 61 wherein:
the memory is a single-ended electronic storage tube.

73. The invention of claim 72 including:
an ultrasound transducer;
a generator connected to the ultrasound transducer to excite the same to produce an ultrasound acoustic pulse to be transmitted into a medium from which ultrasound acoustic reflections are retransmitted to the ultrasound transducer;
a processing circuit connected to the ultrasound transducer to convert the electrical signals converted by the ultrasound transducer from the ultrasound acoustic reflections into the incoming signal supplied to the scan converter.

74. The invention of claim 72 including:
a sonar transducer;
a generator connected to the sonar transducer to excite the same to produce an acoustic pulse to be transmitted into a liquid from which acoustic reflections are retransmitted to the sonar transducer;
a processing circuit connected to the sonar transducer to convert the electrical signals converted by the sonar transducer from the acoustic reflections into the incoming signal supplied to the scan converter.

75. The invention of claim 72 including:
a radar antenna;
a generator connected to the radar antenna to excite the same to transmit a radio pulse into a medium from which radio reflections are retransmitted to the radar antenna;
a processing circuit connected to the radar antenna to convert the signals from the radio reflections into the incoming signal supplied to the scan converter.

76. The invention of claim 72 including:
a facsimile receiver which receives slow scan composite video signals;
means for converting the slow scan composite video signals into the incoming signal supplied to the scan converter.

77. The invention of claim 71 including:
a ultrasound transducer;
a generator connected to the ultrasound transducer to excite the same to produce an ultrasound acoustic pulse to be transmitted into a medium from which ultrasound acoustic reflections are retransmitted to the ultrasound transducer;
a processing circuit connected to the ultrasound transducer to convert the electrical signals converted by the ultrasound transducer from the ultrasound acoustic reflections into the incoming signal supplied to the scan converter.

78. The invention of claim 71 including:
a sonar transducer;
a generator connected to the sonar transducer to excite the same to produce an acoustic pulse to be transmitted into a liquid from which acoustic reflections are retransmitted to the sonar transducer;
a processing circuit connected to the sonar transducer to convert the electrical signals converted by the sonar transducer from the acoustic reflections into the incoming signal supplied to the scan converter.

79. The invention of claim 71 including:
a radar antenna;
a generator connected to the radar antenna to excite the same to transmit a radio pulse into a medium from which radio reflections are retransmitted to the radar antenna;
a processing circuit connected to the radar antenna to convert the signals from the radio reflections into the incoming signal supplied to the scan converter.

80. The invention of claim 71 including:
a facsimile receiver which receives slow scan composite video signals;
means for converting the slow scan composite video signals into the incoming signal supplied to the scan converter.

81. The invention of claim 70 including:
an ultrasound transducer;
a generator connected to the ultrasound transducer to excite the same to produce an ultrasound acoustic pulse to be transmitted into a medium from which ultrasound acoustic reflections are retransmitted to the ultrasound transducer;
a processing circuit connected to the ultrasound transducer to convert the electrical signals converted by the ultrasound transducer from the ultrasound acoustic reflections into the incoming signal supplied to the scan converter.

82. The invention of claim 70 including:
a sonar transducer;
a generator connected to the sonar transducer to excite the same to produce an acoustic pulse to be transmitted into a liquid from which acoustic reflections are retransmitted to the sonar transducer;
a processing circuit connected to the sonar transducer to convert the electrical signals converted by the sonar transducer from the acoustic reflections into the incoming signal supplied to the scan converter.

83. The invention of claim 70 including:
a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

84. The invention of claim 70 including:

facsimile facsimilie receiver which receives slow scan composite video signals;

means for converting the slow scan composite video signals into the incoming signal supplied to the scan converter.

85. The invention of claim 69 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

86. The invention of claim 69 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

87. The invention of claim 69 including:

a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

88. The invention of claim 69 including:

a facsimile receiver which receives slow scan composite video signals;

means for converting the slow scan composite video signals into the incoming signal supplied to the scan converter.

89. The invention of claim 68 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

90. The invention of claim 68 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

91. The invention of claim 68 including:

a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

92. The invention of claim 68 including:

a facsimile receiver which receives slow scan composite video signals;

means for converting the slow scan composite video signals into the incoming signal supplied to the scan converter.

93. The invention of claim 67 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

94. The invention of claim 67 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

95. The invention of claim 67 including:

a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

96. The invention of claim 67 including:

a facsimile receiver which receives slow scan composite video signals;

means for converting the slow scan composite video signals into the incoming signal supplied to the scan converter.

97. The invention of claim 66 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

98. The invention of claim 66 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

99. The invention of claim 66 including:

a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

100. The invention of claim 66 including:

a facsimile receiver which receives slow scan composite video signals;

means for converting the slow scan composite video signals into the incoming signal supplied to the scan converter.

101. The invention of claim 65 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

102. The invention of claim 65 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

103. The invention of claim 65 including:

a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

104. The invention of claim 65 including:

a facsimile receiver which receives slow scan composite video signals;

means for converting the slow scan composite video signals into the incoming signal supplied to the scan converter.

105. The invention of claim 64 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

106. The invention of claim 64 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

107. The invention of claim 64 including:

a radar antenna;

a generator connected to the radar antenna to excite the same to transmit a radio pulse into a medium from which radio reflections are retransmitted to the radar antenna;

a processing circuit connected to the radar antenna to convert the signals from the radio reflections into the incoming signal supplied to the scan converter.

108. The invention of claim 64 including:

a facsimile receiver which receives slow scan composite video signals;

means for converting the slow scan composite video signals into the incoming signal supplied to the scan converter.

109. The invention of claim 63 including:

an ultrasound transducer;

a generator connected to the ultrasound transducer to excite the same to produce an ultrasound acoustic pulse to be transmitted into a medium from which ultrasound acoustic reflections are retransmitted to the ultrasound transducer;

a processing circuit connected to the ultrasound transducer to convert the electrical signals converted by the ultrasound transducer from the ultrasound acoustic reflections into the incoming signal supplied to the scan converter.

110. The invention of claim 63 including:

a sonar transducer;

a generator connected to the sonar transducer to excite the same to produce an acoustic pulse to be transmitted into a liquid from which acoustic reflections are retransmitted to the sonar transducer;

a processing circuit connected to the sonar transducer to convert the electrical signals converted by the sonar transducer from the acoustic reflections into the incoming signal supplied to the scan converter.

111. The invention of claim 63 including:
a radar antenna;
a generator connected to the radar antenna to excite the same to transmit a radio pulse into a medium from which radio reflections are retransmitted to the radar antenna;
a processing circuit connected to the radar antenna to convert the signals from the radio reflections into the incoming signal supplied to the scan converter.

112. The invention of claim 63 including:
a facsimile receiver which receives a slow scan composite video signals;
means for converting the slow scan composite video signals into the incoming signal supplied to the scan converter.

113. The invention of claim 62 including:
an ultrasound transducer;
a generator connected to the ultrasound transducer to excite the same to produce an ultrasound acoustic pulse to be transmitted into a medium from which ultrasound acoustic reflections are retransmitted to the ultrasound transducer;
a processing circuit connected to the ultrasound transducer to convert the electrical signals converted by the ultrasound transducer from the ultrasound acoustic reflections into the incoming signal supplied to the scan converter.

114. The invention of claim 62 including:
a sonar transducer;
a generator connected to the sonar transducer to excite the same to produce an acoustic pulse to be transmitted into a liquid from which acoustic reflections are retransmitted to the sonar transducer;
a processing circuit connected to the sonar transducer to convert the electrical signals converted by the sonar transducer from the acoustic reflections into the incoming signal supplied to the scan converter.

115. The invention of claim 62 including:
a radar antenna;
a generator connected to the radar antenna to excite the same to transmit a radio pulse into a medium from which radio reflections are retransmitted to the radar antenna;
a processing circuit connected to the radar antenna to convert the signals from the radio reflections into the incoming signal supplied to the scan converter.

116. The invention of claim 62 including:
a facsimile receiver which receives slow scan composite video signals;
means for converting the slow scan composite video signals into the incoming signal supplied to the scan converter.

117. The invention of claim 61 including:
an ultrasound transducer;
a generator connected to the ultrasound transducer to excite the same to produce an ultrasound acoustic pulse to be transmitted into a medium from which ultrasound acoustic reflections are retransmitted to the ultrasound transducer;
a processing circuit connected to the ultrasound transducer to convert the electrical signals converted by the ultrasound transducer from the ultrasound acoustic reflections into the incoming signal supplied to the scan converter.

118. The invention of claim 61 including:
a sonar transducer;
a generator connected to the sonar transducer to excite the same to produce an acoustic pulse to be transmitted into a liquid from which acoustic reflections are retransmitted to the sonar transducer;
a processing circuit connected to the sonar transducer to convert the electrical signals converted by the sonar transducer from the acoustic reflections into the incoming signal supplied to the scan converter.

119. The invention of claim 61 including:
a radar antenna;
a generator connected to the radar antenna to excite the same to transmit a radio pulse into a medium from which radio reflections are retransmitted to the radar antenna;
a processing circuit connected to the radar antenna to convert the signals from the radio reflections into the incoming signal supplied to the scan converter.

120. The invention of claim 61 including:
a facsimile receiver which receives slow scan composite video signals;
means for converting the slow scan composite video signals into the incoming signal supplied to the scan converter.

* * * * *